United States Patent [19]
Lynch et al.

[11] Patent Number: 5,438,423
[45] Date of Patent: Aug. 1, 1995

[54] TIME WARPING FOR VIDEO VIEWING

[75] Inventors: Eugene F. Lynch, Portland; Guy W. Cherry, Beaverton; Mayer D. Schwartz, Portland, all of Oreg.

[73] Assignee: Tektronix, Inc., Wilsonville, Oreg.

[21] Appl. No.: 240,942

[22] Filed: May 11, 1994

Related U.S. Application Data

[63] Continuation of Ser. No. 81,943, Jun. 25, 1993, abandoned.

[51] Int. Cl.⁶ .............................................. H04N 5/76
[52] U.S. Cl. .................... 358/335; 360/33.1; 360/13
[58] Field of Search ............... 358/335, 337, 338, 339, 358/310; 360/31, 33.1, 36.2, 5, 13, 14.1, 14.2, 14.3; H04N 5/76, 9/79

[56] References Cited

U.S. PATENT DOCUMENTS

5,134,499  7/1992  Sata et al. ........................... 358/335

FOREIGN PATENT DOCUMENTS

3936994  5/1991  Germany .
9113695  9/1991  WIPO .

*Primary Examiner*—Tommy P. Chin
*Assistant Examiner*—Khoi Truong
*Attorney, Agent, or Firm*—Francis I. Gray; John Smith-Hill; John D. Winkelman

[57] ABSTRACT

Time warping for video viewing is achieved by providing a random access dynamic buffer for a video signal from a selected video channel. The video signal is continuously written into the dynamic buffer in a recirculating fashion, and may be read out on a random access basis so that the viewer may control the realtime video viewing in the same manner as controlling a video cassette recorder up to the duration of the video signal stored in the dynamic buffer. In addition the viewer may view the video at various speeds and skip to any point in the stored information. Portions of the video signal in the dynamic buffer may be stored in a static buffer or transferred permanently to a video cassette recorder for subsequent manipulation by the viewer. To expand the capacity of the dynamic buffer a compression circuit may be provided for compressing the video signal before being written into the dynamic buffer. Likewise a decompression circuit for the compressed video signal from the dynamic buffer reconstructs a full bandwidth video signal for display.

15 Claims, 1 Drawing Sheet

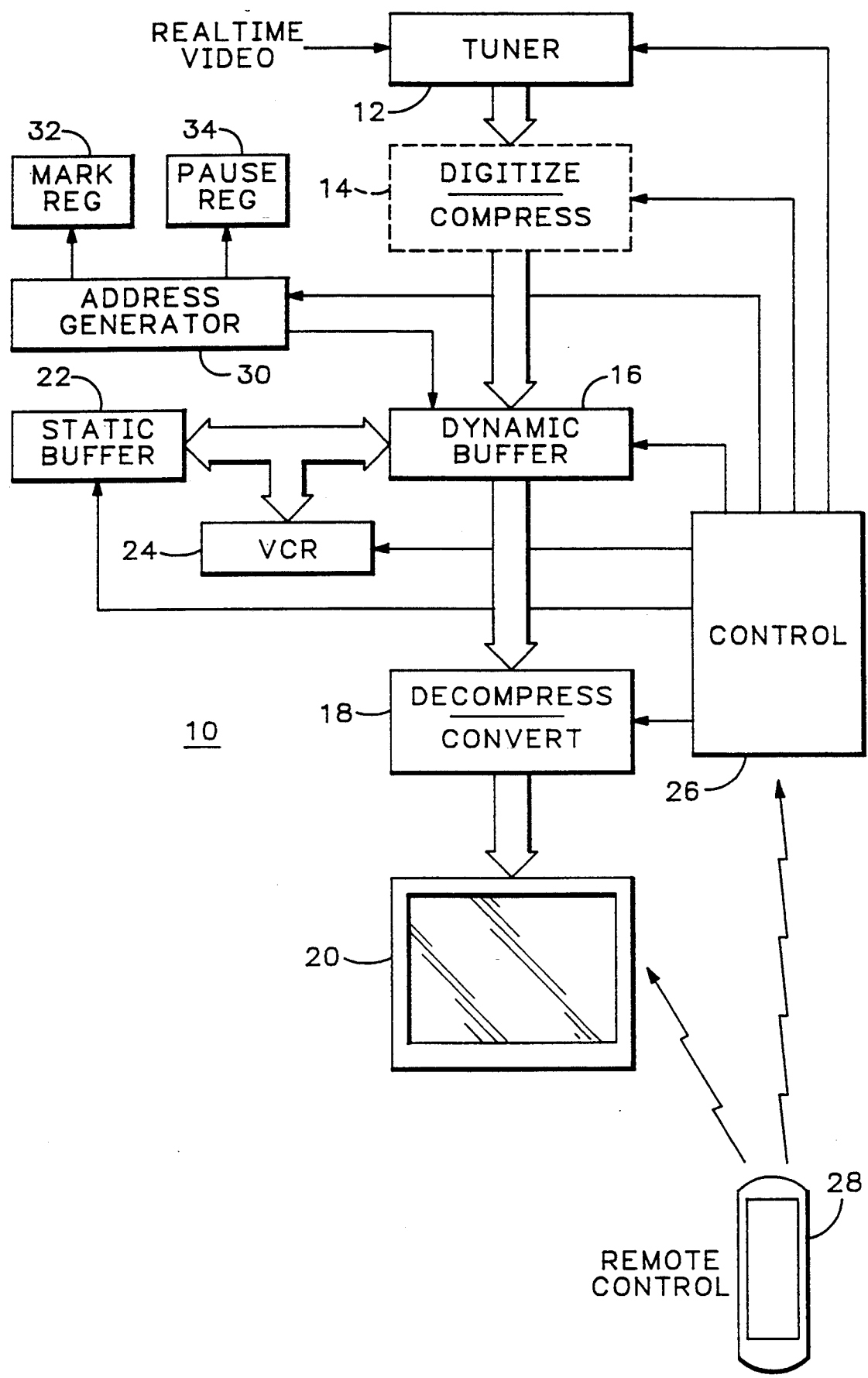

TIME WARPING FOR VIDEO VIEWING

This is a continuation of application Ser. No. 08/081,943 filed Jun. 25, 1993 which is now abandoned.

BACKGROUND OF THE INVENTION

The present invention relates to processing of realtime video signals, and more particularly to time warping for video viewing by managing delay, review and continuation of realtime video signals.

Live video, broadcast video, one-way cable video and scheduled pay-for-view video provide time linear video signals, i.e., the program begins at a certain time and runs for a definite duration with constant rate. In many situations once the program begins the viewer has no control over the source of the video. In these cases the video is referred to as being "realtime". When viewing realtime video, if a viewer's attention is required elsewhere, such as for answering the telephone or doorbell, responding to family crises, someone walking in an office, and the like, the information or entertainment in the program is lost. One way to avoid losing information or entertainment value is to record the program as it is being viewed on a video cassette recorder (VCR). In this way if interruptions occur, after the completion of the program it can be replayed to recover the portions missed during the interruptions. However this destroys the continuity of the viewing and decreases the information or entertainment value of the program.

What is desired is a time warping of the video program so that the viewer may view the program in its entirety in a linear or non-linear manner without loss of information or entertainment value despite interruptions in order to increase the value and control of the information or entertainment.

SUMMARY OF THE INVENTION

Accordingly the present invention provides time warping for video viewing by continuously storing the video content of a program in a recirculating random access buffer having sufficient capacity to store a significant duration of the program. The video content of the program may be compressed to increase the duration of the program that is stored at any given time. When an interruption occurs, a marker is placed by the viewer in the buffer. When the viewer returns, the video is played back from the buffer starting at the marker so that the viewer starts viewing from the point at which the interruption occurred in a time delayed manner. The viewer may play back the video at any rate desired, using slow motion to observe so:me scenes and using fast motion to catch up to the live video. The viewer may also review stored video or view one or more frozen frames of the video. Further the viewer may mark portions of the live video for saving in a static buffer, from which the portions may be replayed at any subsequent time or transferred to a VCR. The video from the buffer, if compressed, is played back in uncompressed form. While the viewer is involved in playback, the buffer still is filling with :new realtime video.

The objects, advantages and other novel features of the present invention are apparent from the following detailed description when read in conjunction with the appended claims and attached drawing.

BRIEF DESCRIPTION OF THE DRAWING

The FIGURE is a block diagrammatic view of a system for time warping for video viewing according to the present invention.

DESCRIPTION OF THE PREFERRED EMBODIMENT

Referring now to the FIGURE, a video time warping system 10 receives realtime video from some source, whether from a cable or off the air via an antenna, that is input to a television tuner 12 to provide a video signal for a selected video channel. The video signal may be full bandwidth video, either analog or digital, or compressed video. If the video signal is analog, then it is digitized to convert it to digital. If the video signal is not compressed, then a compression circuit 14 is used to compress according to an accepted television compression standard, such as the JPEG or MPEG standard. The compressed video is written into a dynamic buffer 16, such as a magnetic or optical disk, in a linear, recirculating fashion. The dynamic buffer 16 preferably has a capacity capable of containing at least thirty minutes of compressed video. The compressed video is read from the dynamic buffer 16 and processed by a decompression circuit 18 to reconstruct the full bandwidth video signal. The full bandwidth video signal is then converted and displayed by the display circuitry 20 of a television set or a video monitor.

Coupled to the dynamic buffer 16 may be a video cassette recorder 24 and/or a static buffer 22 for storing desired portions of the compressed video from the dynamic buffer, or for playing back the stored portions via the dynamic buffer. A control circuit 26, in response to commands generated by a viewer, such as with a remote control device 28, determines whether and the amount of compression to be applied by the compression circuit 14; controls writing into and reading out of the dynamic buffer 16; controls writing into and playing back from the static buffer 22 and VCR 24; controls selection of the channel by the tuner 12; and controls the decompression circuit 18 for reconstruction of the full bandwidth video for display.

In normal viewing the video feed is compressed and stored in the dynamic buffer 16 in consecutive addresses generated by a recirculating address counter 30. The video feed, if uncompressed, :may also be transmitted directly to the display circuitry 20. If the video feed is compressed, then the compressed video may be sent directly to the decompression circuit 18 or stored directly in the dynamic buffer 16 and immediately read out through the decompression circuit for the display circuitry 20. The slight delay between writing into the dynamic buffer 16 and reading out for the display circuitry 20 is not apparent to the viewer so that the viewer sees the video program in a realtime, linear fashion. At any time from the remote control unit 28 the viewer may command the control circuit 26 to mark a point in the video program. When the mark command is given, the current address for the dynamic buffer 16 is stored in a mark register 32. At any time before the video program in the dynamic buffer 16 is overwritten, the viewer may return to the marked point in the video program by giving via the remote control unit 28 a replay command to the control unit 26 so that the dynamic buffer reads the video program from the dynamic buffer 16 using the marked address as a starting read address.

When the viewer is interrupted for any reason, the viewer may give via the remote control unit 28 a pause command to the control circuitry 26. The pause command causes the current address for the dynamic buffer 16 to be stored in a pause register 34, suspending further read out from the dynamic buffer 16 for the display circuitry 20, with the video frame of the video program at the pause address being displayed as a still frame. When the viewer returns after the interruption, the viewer may give via the remote control unit 28 a continue command to the control unit 26 so that the dynamic buffer 16 reads out the video program in a delayed, realtime fashion from the pause address. Such continuation of the video may be viewed at any desired rate, realtime, slow motion or fast forward, and in either direction, forward or reverse. By using a skip command the viewer may skip forward a specified number of video frames, such as in fifteen or thirty second increments. The viewer may also view the video at a faster than realtime rate using a variable speed control to eventually catch up to the live video feed.

If the viewer wishes to save a portion of the video program, a save command may be used to cause a segment, either of fixed or variable duration, of the video program to be transferred to the static buffer 22, which may be a reserved portion of the dynamic buffer 16 as determined by the viewer. The use of a portion of the dynamic buffer 16 as the static buffer 22 reduces the amount of video program material available to the viewer at any one time. The saved video from the static buffer 22 may be viewed upon command at any desired rate, realtime, slow motion or fast forward, and in either direction, forward or reverse. If permanent saving is desired, the video from the static buffer 22 may be transferred to the VCR 24. Of course the video from the dynamic buffer 16 may also be transferred to the VCR 24 directly rather than being buffered by the static buffer 22.

The viewer may also view the video program on a delayed basis rather than in realtime. Catch up with realtime may be achieved by the fast forward mode or the skip mode. The viewer has the ability to personally replay recent events in the dynamic buffer 16, either in forward or reverse directions or at a desired speed. Segments of the video program may be saved for later use, either in the static buffer 22 or the VCR 24, and may be retrieved from the VCR for non-linear play. The viewer may scan other channels by having the tuner 12 provide one channel for continuous writing into the dynamic buffer 16 while providing another channel that is fed directly to the display circuitry 20, and the viewer may return to the original program without missing any of the program information or entertainment value. For window-in-window applications the viewer may watch the current program in realtime while catching up in the window, or vice versa. The random access capability provides the viewer with cuts-only editing capabilities, as portions of the program may be buffered in the static buffer 22, and access to the entire compressed video in the dynamic buffer 16 is available for forming an edit decision list. Further the amount of compression may be controlled by the viewer, providing the viewer with the decision of how to trade-off quality with amount of material to be stored at one time on the dynamic buffer 16.

Thus the present invention provides a viewer with a time warping capability for a live video feed by providing a random access storage device for compressed video so that the live video may be written into the storage device in realtime while simultaneously being read out from any point.

What is claimed is:

1. A system of time warping for video viewing in a video receiver having a tuner for selecting a video channel and providing a time linear input video signal and a display device for displaying a video signal comprising:
   a recirculating dynamic buffer coupled to the tuner for continuously receiving the time linear input video signal provided by the tuner so that a segment of the time linear input video signal having a predetermined duration is temporarily stored in the recirculating dynamic buffer;
   control means responsive to a PAUSE command for marking the segment of the time linear video signal stored in the recirculating dynamic buffer with an access point; and
   means for randomly accessing the segment of the time linear video signal stored in the recirculating dynamic buffer to provide an output video signal for display by the display device so that the segment of the time linear video signal can be accessed for subsequent display from the access point simultaneously with continued buffering of the time linear input video signal.

2. The system of claim further comprising:
   means for compressing the video signal prior to inputting to the recirculating dynamic buffer; and
   means for decompressing the compressed video signal from the recirculating dynamic buffer prior to inputting to the display circuitry.

3. The system of claim 1 further comprising a static buffer coupled to the recirculating dynamic buffer for storing selected segments of the video signal from the recirculating dynamic buffer for subsequent review, the selected segments being determined by the marking means.

4. The system of claim 3 further comprising means for permanently storing the video signal from the recirculating dynamic buffer or the static buffer.

5. A method of time warping for video viewing a video signal from a selected video channel comprising the steps of:
   continuously writing the video signal into a dynamic buffer, the buffer storing a segment of the video signal;
   simultaneously reading the video signal on a random access basis from the dynamic buffer for display until a PAUSE command is asserted; and
   upon assertion of the PAUSE command, interrupting the reading of the video signal from the dynamic buffer without interrupting writing of the video signal to the dynamic buffer and marking the segment of the video signal in the dynamic buffer with an access point so that the video signal can be accessed for subsequent reading from the access point onward.

6. The method as recited in claim 5 wherein the reading step comprises the step of controlling a speed and direction in which the video signal is read from the dynamic buffer.

7. A method of time warping for video viewing a time linear video signal from a selected video channel as it is being received comprising the steps of:
   continuously writing the time linear video signal into a dynamic recirculating buffer, the buffer storing a segment of the video signal having a predetermined duration;

simultaneously displaying the video signal from the dynamic recirculating buffer on a display device until a PAUSE command is asserted;

upon assertion of the PAUSE command, interrupting the displaying of the video signal and marking the dynamic recirculating buffer at a point of the stored segment of the video signal where the interruption occurs; and subsequently restarting from the marked point the displaying of the video signal from the dynamic recirculating buffer so that the video signal is displayed in time sequence.

8. Apparatus for time warping a time linear input video signal comprising:

a dynamic buffer connected to continuously receive the time linear input video signal and temporarily store a time segment of the time linear input video signal;

reading means for reading the time segment of the time linear input video signal to provide an output video signal;

command means for asserting a PAUSE command and for subsequently asserting a CONTINUE command;

control means responsive to the PAUSE command for marking the time segment of the time linear input video signal stored in the dynamic buffer with an access point without interrupting writing of the time linear input video signal to the dynamic buffer, the reading means being responsive to the CONTINUE command for reading the time segment of the time linear input video signal stored in the dynamic buffer from the access point onward to provide a time linear output video signal without interrupting writing of the time linear input video signal to the dynamic buffer.

9. Apparatus according to claim 8, wherein the dynamic buffer has a plurality of storage locations defined by respective addresses, and the apparatus comprises an address counter for generating write addresses in recirculating fashion for writing the time linear input video signal to the dynamic buffer, and a pause register, and wherein the control means is responsive to the PAUSE command to store a current address for the dynamic buffer in the pause register.

10. Apparatus according to claim 8, wherein the dynamic buffer has a plurality of storage locations defined by respective addresses, the command means is operative to assert a MARK command and subsequently assert a REPLAY command, and the apparatus comprises an address counter for generating write addresses in recirculating fashion for writing the time linear input video signal to the dynamic buffer, and a mark register, and wherein the control means is responsive to the MARK command to store a current address for the dynamic buffer in the mark register while continuing to read the video signal from the dynamic buffer and is responsive to the REPLAY command to read the time segment of the time linear input video signal stored in the dynamic buffer from the stored address onward to provide a time linear output video signal without interrupting writing of the time linear input video signal to the dynamic buffer.

11. Apparatus according to claim 8, comprising a display device coupled to display the video signal read by the reading means from the dynamic buffer.

12. Apparatus according to claim 8, comprising a tuner for selecting the time linear input video signal from among a plurality of available signals.

13. A method of time warping a video signal from a selected video channel comprising the steps of:

continuously writing the video signal into a dynamic buffer, the buffer storing a segment of the video signal;

simultaneously reading the video signal from the dynamic buffer until a PAUSE command is asserted;

upon assertion of the PAUSE command,
interrupting the reading of the video signal from the dynamic buffer while continuing to write the video signal to the dynamic buffer, and marking the video signal in the dynamic buffer with an access point so that the video signal can be accessed by the randomly accessing means for subsequent reading from the access point; and upon subsequent assertion of a CONTINUE command, resuming reading of the video signal from the dynamic buffer from the marked access point so that the video signal is read from the dynamic buffer in time sequence.

14. A method according to claim 13, further comprising asserting a MARK command and, in response to the MARK command, marking the video signal in the dynamic buffer with an access point while continuing to write the video signal to and read the video signal from the dynamic-buffer, and subsequently asserting a REPLAY command and, in response to the REPLAY command, reading the video'signal from the dynamic buffer from the access point that was marked in response to the MARK command.

15. A method according to claim 13, further comprising the step of displaying the video signal read from the dynamic buffer.

* * * * *

(12) REEXAMINATION CERTIFICATE (4632nd) United States Patent
Lynch et al.

(10) Number: US 5,438,423 C1
(45) Certificate Issued: Aug. 27, 2002

(54) TIME WARPING FOR VIDEO VIEWING

(75) Inventors: Eugene F. Lynch, Portland; Guy W. Cherry, Beaverton; Mayer D. Schwartz, Portland, all of OR (US)

(73) Assignee: Grass Valley (US) Inc., Nevada City, CA (US)

Reexamination Request:
No. 90/005,636, Feb. 11, 2000

Reexamination Certificate for:
Patent No.: 5,438,423
Issued: Aug. 1, 1995
Appl. No.: 08/240,942
Filed: May 11, 1994

Related U.S. Application Data

(63) Continuation of application No. 08/081,943, filed on Jun. 25, 1993, now abandoned.

(51) Int. Cl.[7] .................................................. H04N 5/76
(52) U.S. Cl. .......................................... 386/109; 360/13
(58) Field of Search .......................... 386/46, 109, 112, 386/125, 68, 77; 348/714, 715; 360/13

(56) References Cited

U.S. PATENT DOCUMENTS 5,241,428 A 8/1993 Goldwasser et al.
5,371,551 A * 12/1994 Logan et al. ................ 386/112
RE36,801 E 8/2000 Logan et al.

FOREIGN PATENT DOCUMENTS

| JP | Sho 63-76558 | 3/1988 |
| JP | 2-44569 | 8/1988 |
| JP | 2-61859 | 8/1988 |
| JP | 2(1990)-60382 | 8/1988 |

* cited by examiner

*Primary Examiner*—Huy Nguyen

(57) ABSTRACT

Time warping for video viewing is achieved by providing a random access dynamic buffer for a video signal from a selected video channel. The video signal is continuously written into the dynamic buffer in a recirculating fashion, and may be read out on a random access basis so that the viewer may control the realtime video viewing in the same manner as controlling a video cassette recorder up to the duration of the video signal stored in the dynamic buffer. In addition the viewer may view the video at various speeds and skip to any point in the stored information. Portions of the video signal in the dynamic buffer may be stored in a static buffer or transferred permanently to a video cassette recorder for subsequent manipulation by the viewer. To expand the capacity of the dynamic buffer a compression circuit may be provided for compressing the video signal before being written into the dynamic buffer. Likewise a decompression circuit for the compressed video signal from the dynamic buffer reconstructs a full bandwidth video signal for display.

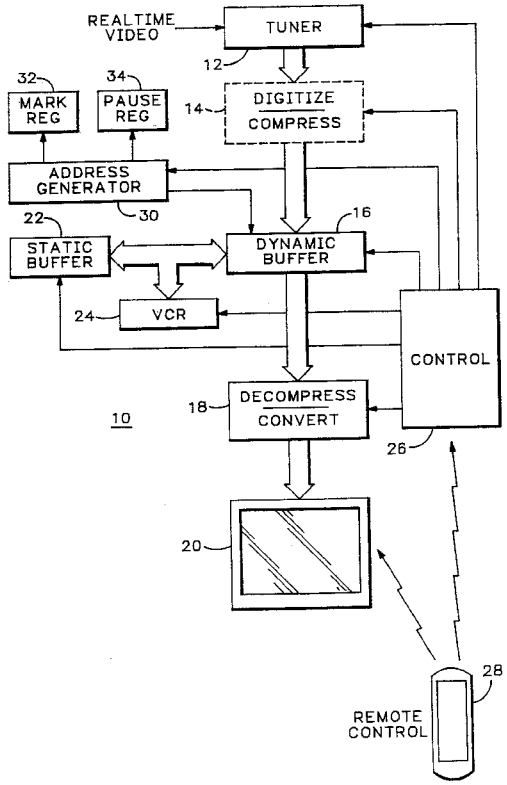

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, 7, 8 and 13 are cancelled.

Claims 2–3, 6, 9–12, 14 and 15 are determined to be patentable as amended.

Claim 4, dependent on an amended claim, is determined to be patentable.

New claims 16–19 are added and determined to be patentable.

2. The system of claim 3 further comprising:
  means for compressing the *time linear input* video signal prior to inputting to the recirculating dynamic buffer; and
  means for decompressing the compressed *time linear input* video signal from the recirculating dynamic buffer prior to inputting to the display [circuitry] *device*.

3. [The] *A* system [of claim 1 further] *of time warping for video viewing in a video receiver having a tuner for selecting a video channel and providing a time linear input video signal and having a display device for displaying a video signal* comprising:
  *a recirculating dynamic buffer coupled to the tuner for continuously receiving the time linear input video signal provided by the tuner so that a segment of the time linear input video signal having a predetermined duration is temporarily stored in the recirculating dynamic buffer;*
  *control means responsive to a PAUSE command for marking the segment of the time linear video signal stored in the recirculating dynamic buffer with an access point;*
  *means for randomly accessing the segment of the time linear video signal stored in the recirculating dynamic buffer to provide the video signal for display by the display device so that the segment of the time linear video signal can be accessed for subsequent display from the access point simultaneously with continued receiving of the time linear input video signal; and*
  a static buffer coupled to the recirculating dynamic buffer for storing selected segments of the video signal from the recirculating dynamic buffer for subsequent review, the selected segments being determined by the marking means.

6. The method as recited in claim [5] *16* wherein the reading step comprises the step of controlling a speed and direction in which the video signal is read from the dynamic buffer.

9. Apparatus [according to claim 8, wherein] *for time warping a time linear input video signal comprising:*
  *a dynamic buffer connected to continuously receive the time linear input video signal and temporarily store a time segment of the time linear input video signal,* the dynamic buffer [has] *having* a plurality of storage locations defined by respective addresses[, and the apparatus comprises];
  an address counter for generating write addresses in recirculating fashion for writing the time linear input video signal to the dynamic buffer[, and];
  a pause register[, and wherein];
  *reading means for reading the time segment of the time linear input video signal to provide an output video signal;*
  *command means for asserting a PAUSE command and for subsequently asserting a CONTINUE command; and*
  control means responsive to the PAUSE command for marking the *time linear input* video signal stored in the dynamic buffer with an access point without interrupting writing of the *time linear input* video signal to the dynamic buffer, the control means [is] *being* responsive to the PAUSE command to store a current address for the dynamic buffer in the pause register, *and the reading means being responsive to the CONTINUE command for reading the time segment of the time linear input video signal stored in the dynamic buffer from the access point onward to provide a time linear output video signal without interrupting writing of the time linear input video signal to the dynamic buffer.*

10. Apparatus [according to claim 8, wherein] *for time warping a time linear input video signal comprising:*
  *a dynamic buffer connected to continuously receive the time linear input video signal and temporarily store a time segment of the time linear input video signal,* the dynamic buffer [has] *having* a plurality of storage locations defined by respective addresses[, the command means is operative to assert];
  *reading means for reading the time segment of the time linear input video signal to provide an output video signal;*
  *command means for asserting a PAUSE command and for subsequently asserting a CONTINUE command, and for asserting* a MARK command and subsequently assert*ing* a REPLAY command[, and the apparatus comprises];
  an address counter for generating write addresses in recirculating fashion for writing the time linear input video signal to the dynamic buffer[,];
  a mark register[,]; and [wherein]
  control means responsive to the *PA*USE command for marking the *time linear input* video signal stored in the dynamic buffer with an access point without interrupting writing of the *time linear input* video signal to the dynamic buffer, the control means [is] *being* responsive to the MARK command to store a current address for the dynamic buffer in the mark register while continuing to read the video signal from the dynamic buffer and [is] *being* responsive to the REPLAY command to read the time segment of the time linear input video signal stored in the dynamic buffer from the stored address onward to provide a time linear output video signal without interrupting writing of the time linear input video signal to the dynamic buffer, *and the reading means being responsive to the CONTINUE command for reding the time segment of the time linear input video signal stored in the dynamic buffer from the* access point onward to provide a time linear output video signal without interrupting writing of the time linear input video signal to the dynamic buffer.

11. Apparatus according to claim [8] *9*, comprising a display device coupled to display the video signal read by the reading means from the dynamic buffer.

12. Apparatus according to claim [8] *9*, comprising a tuner for selecting the time linear input video signal from among a plurality of available signals.

14. A method [according to claim 13, further] *of time warping a video signal from a selected video channel* comprising *the steps of:* continuously writing the video signal into a dynamic buffer, the buffer storing a segment of the video signal;

simultaneously reading the video signal from the dynamic buffer until a PAUSE command is asserted;

upon assertion of the PAUSE command,
interrupting the reading of the video signal from the dynamic buffer while continuing to write the video signal to the dynamic buffer, and marking the video signal in the dynamic buffer with an access point so that the video signal can be accessed for subsequent reading from the access point;

upon subsequent assertion of a CONTINUE command, resuming reading of the video signal from the dynamic buffer from the marked access point so that the video signal is read from the dynamic buffer in time sequence; and asserting a MARK command and, in response to the MARK command, marking the video signal in the dynamic buffer with a[n] *mark* access point while continuing to write the video signal to and read the video signal from the *dynamic'-buffer*, and subsequently asserting a REPLAY command and, in response to the REPLAY command, reading the from the dynamic buffer from the *mark* access point [that was marked in response to the MARK command].

15. [A] *The* method according to claim [13] *14*, further comprising the step of displaying the video signal read from the dynamic buffer.

16. A method of time warping for video viewing a video signal from a selected video channel comprising the steps of:

continuously writing the video signal into a dynamic buffer, the buffer storing a segment of the video signal;

simultaneously reading the video signal on a random access basis from the dynamic buffer for display until a PAUSE command is asserted;

upon assertion of the PAUSE command, interrupting the reading of the video signal from the dynamic buffer without interrupting writing of the video signal to the dynamic buffer and marking the segment of the video signal in the dynamic buffer with an access point so that the video signal can be accessed for subsequent reading from the access point onward; and storing selected segments of the video signal from the dynamic buffer in a static buffer for subsequent review, the selected segments being determined by the marking step, while still writing the video signal to the dynamic buffer and reading the video signal on a random access basis from the dynamic buffer for display.

17. The method as recited in claim 16 further comprising the step of permanently storing the video signal from the dynamic buffer or from the static buffer upon command.

18. A method of time warping for video viewing a time linear input video signal from a selected video channel as it is being received comprising the steps of:

continuously writing the time linear video signal into a dynamic buffer, the dynamic buffer storing a segment of the time linear video signal having a predetermined duration and the dynamic buffer having a plurality of storage locations defined by respective locations;

generating write addresses in recirculating fashion for writing the time linear video signal into the dynamic buffer;

simultaneously displaying the time linear video signal from the dynamic buffer on a display device until a PAUSE command is asserted;

storing a current address for the dynamic buffer in a pause register when the PAUSE command is asserted; and upon assertion of the PAUSE command, interrupting the displaying of the time linear video signal while still writing the time linear video signal into the dynamic buffer and subsequently restarting the displaying of the time linear video signal from an address in the dynamic buffer corresponding to the current address in the pause register so that the time linear video signal is displayed in time sequence.

19. The method as recited in claim 18 further comprising the steps of:

asserting a MARK command to store a current address for the dynamic buffer in a mark register; and subsequently asserting a REPLAY command to read a time segment of the time linear video signal from the dynamic buffer for display starting from the address in the dynamic buffer corresponding to the current address in the mark register.

\* \* \* \* \*